US012555372B2

(12) United States Patent
Gil et al.

(10) Patent No.: US 12,555,372 B2
(45) Date of Patent: Feb. 17, 2026

(54) IMAGE SENSOR EVALUATION METHOD USING COMPUTING DEVICE INCLUDING PROCESSOR

(71) Applicant: SAMSUNG ELECTRONICS CO., LTD., Suwon-si (KR)

(72) Inventors: Sungho Gil, Seongnam-si (KR); Ohyeong Kim, Suwon-si (KR); Sungsu Kim, Yongin-si (KR); Eun-Ji Yong, Seoul (KR); Joon-Seo Yim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 847 days.

(21) Appl. No.: 17/895,617

(22) Filed: Aug. 25, 2022

(65) Prior Publication Data

US 2023/0069283 A1    Mar. 2, 2023

(30) Foreign Application Priority Data

Aug. 26, 2021 (KR) ......................... 10-2021-0113522
Apr. 26, 2022 (KR) ......................... 10-2022-0051684

(51) Int. Cl.
*G06V 10/98*    (2022.01)
*G06V 10/25*    (2022.01)
*G06V 10/88*    (2022.01)

(52) U.S. Cl.
CPC ............ *G06V 10/993* (2022.01); *G06V 10/25* (2022.01); *G06V 10/89* (2022.01)

(58) Field of Classification Search
CPC ....... G06V 10/993; G06V 10/25; G06V 10/89
See application file for complete search history.

(56) References Cited

U.S. PATENT DOCUMENTS

| 6,970,606 B2 | 11/2005 | Lee et al. |
| 8,890,963 B2 | 11/2014 | Masuda |
| 9,025,910 B2 | 5/2015 | Liu et al. |
| 10,360,447 B2 * | 7/2019 | Nepomniachtchi .. G06V 30/414 |
| 2003/0133623 A1 * | 7/2003 | Lee ........................ H04N 1/403 |
| | | 382/270 |

(Continued)

FOREIGN PATENT DOCUMENTS

| JP | 11-266469 A | 9/1999 |
| JP | 3618998 B2 | 2/2005 |
| JP | 4479980 B2 | 6/2010 |

OTHER PUBLICATIONS

DSP First, "Octave Band Filtering," 2004, p. 1-11. (Year: 2004).*

*Primary Examiner* — Emily C Terrell
*Assistant Examiner* — Daniella M. DiGuglielmo
(74) *Attorney, Agent, or Firm* — Sughrue Mion, PLLC

(57) ABSTRACT

Provided is an image sensor evaluation method using a computing device including a processor, the method including receiving, by the processor, image data obtained by capturing a plurality of neighboring lines by an image sensor, performing, by the processor, a spatial domain analysis on the image data to generate a first quality score of the image sensor, performing, by the processor, a frequency domain analysis on the image data to generate a second quality score of the image sensor, and generating, by the processor, a final quality score of the image sensor based on the first quality score and the second quality score.

18 Claims, 15 Drawing Sheets

(56) References Cited

U.S. PATENT DOCUMENTS

| | | | |
|---|---|---|---|
| 2005/0094183 A1* | 5/2005 | Kojima | H04N 1/00342 |
| | | | 358/1.14 |
| 2010/0202668 A1* | 8/2010 | Du | G06V 10/993 |
| | | | 382/117 |
| 2013/0169823 A1* | 7/2013 | Masuda | H04N 17/002 |
| | | | 348/187 |
| 2014/0169662 A1* | 6/2014 | Liu | H04N 19/59 |
| | | | 382/218 |
| 2021/0019345 A1* | 1/2021 | Kim | G06F 16/5854 |

* cited by examiner

IMAGE SENSOR EVALUATION METHOD USING COMPUTING DEVICE INCLUDING PROCESSOR

CROSS-REFERENCE TO RELATED APPLICATIONS

This application claims priority under 35 U.S.C. § 119 to Korean Patent Application No. 10-2021-0113522 filed on Aug. 26, 2021, and Korean Patent Application No. 10-2022-0051684 filed on Apr. 26, 2022, in the Korean Intellectual Property Office, the disclosures of which are incorporated by reference herein in their entireties.

BACKGROUND

Embodiments of the present disclosure described herein relate to an image sensor evaluation method, and more particularly, relate to a method of automatically evaluating a quality, by which an image sensor captures a text, by using a computing device.

An image sensor collects a light reflected from a target and converts the collected light into an image (or image data). The process in which the image sensor generates an image may include a plurality of correlated algorithms. The image may be distorted in the process of executing the plurality of correlated algorithms.

The degree of distortion occurring in the image sensor may vary depending on process variations of the image sensor. Accordingly, after manufacturing the image sensor, there is a need to evaluate the quality of the image sensor and to distinguish a normal image sensor and a defective image sensor. The process of evaluating the quality of the image sensor may include generating an image by using the image sensor and quantifying the degree of distortion of the image based on empirical visual evaluation of a user.

SUMMARY

Embodiments of the present disclosure provide a computing device configured to automatically evaluate the quality of an image sensor, in detail, configured to evaluate the distortion of a text on an image and an operating method of the computing device.

According to an aspect of an embodiment, there is provided an image sensor evaluation method using a computing device including a processor, the method including receiving, by the processor, image data obtained by capturing a plurality of neighboring lines by an image sensor, performing, by the processor, a spatial domain analysis on the image data to generate a first quality score of the image sensor, performing, by the processor, a frequency domain analysis on the image data to generate a second quality score of the image sensor, and generating, by the processor, a final quality score of the image sensor based on the first quality score and the second quality score.

According to another aspect of an embodiment, there is provided an image sensor evaluation method using a computing device including a processor, the method including receiving, by the processor, image data obtained by capturing a plurality of neighboring lines through an image sensor, performing, by the processor, Fourier transform on a shape of the plurality of neighboring lines on the image data to generate frequency domain data, performing, by the processor, band pass filtering on the frequency domain data, performing, by the processor, inverse Fourier transform on result data of the band pass filtering, obtaining, by the processor, a degree of similarity between result data of the inverse Fourier transform and the plurality of neighboring lines, and normalizing, by the processor, the degree of similarity to generate a quality score of the image sensor.

According to another aspect of an embodiment, there is provided a computing device including a memory configured to receive image data obtained by capturing a plurality of neighboring lines from an image sensor, and a processor configured to receive the image data from the memory, generate a first quality score of the image sensor by performing a spatial domain analysis on the received image data, generate a second quality score of the image sensor by performing a frequency domain analysis on the received image data, and generate a final quality score of the image sensor based on the first quality score and the second quality score, wherein the plurality of neighboring lines on the image data include lines extending in a second direction and disposed in a first direction perpendicular to the second direction, and wherein the final quality score corresponds to a quality when the image sensor captures a text.

BRIEF DESCRIPTION OF DRAWINGS

The above and other objects and features of the present disclosure will become apparent by describing in detail embodiments thereof with reference to the accompanying drawings.

DETAILED DESCRIPTION

Below, embodiments of the present disclosure may be described in detail and clearly to such an extent that an ordinary one in the art easily implements the present disclosure. Embodiments described herein are example embodiments, and thus, the disclosure is not limited thereto.

Figure 1:
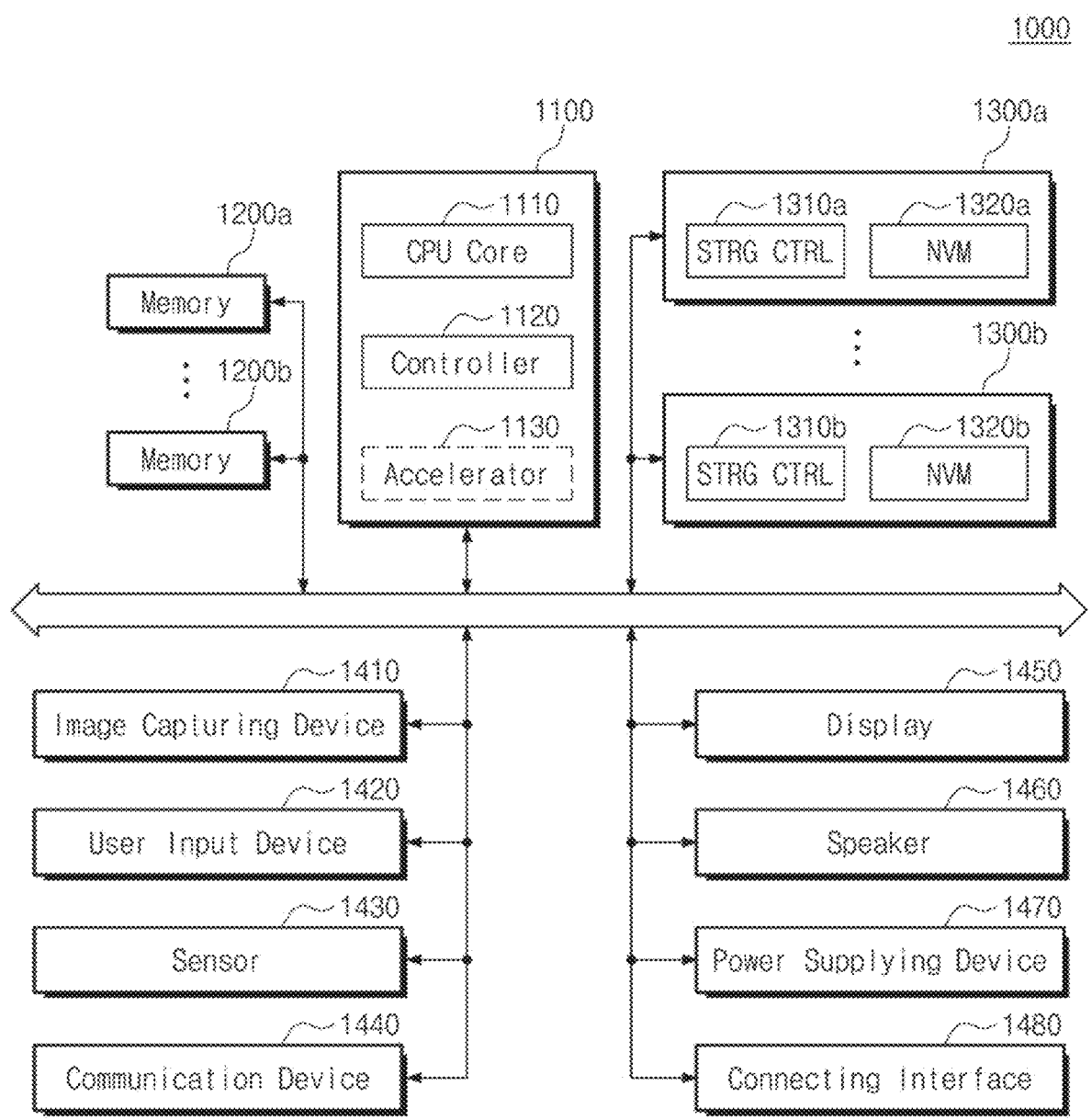
FIG. 1 is a diagram illustrating an image evaluation system according to an embodiment.

FIG. 1 is a diagram of an image evaluation system 1000 to which a storage device is applied, according to an embodiment. The image evaluation system 1000 of FIG. 1 may be a mobile system such as, for example, a portable communication terminal (e.g., a mobile phone), a smartphone, a tablet personal computer (PC), a wearable device, a healthcare device, or an Internet of things (IOT) device. However, the image evaluation system 1000 of FIG. 1 is not necessarily limited to the mobile system and may be a PC, a laptop computer, a server, a media player, or an automotive device (e.g., a navigation device).

Referring to FIG. 1, the image evaluation system 1000 may include a main processor 1100, memories (e.g., 1200*a* and 1200*b*), and storage devices (e.g., 1300*a* and 1300*b*). In addition, the image evaluation system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the image evaluation system 1000, more specifically, operations of all of the components included in the image evaluation system 1000. The main processor 1100 may be implemented as a general-purpose processor, a dedicated processor, or an application processor.

The main processor 1100 may include at least one central processing unit (CPU) core 1110 and further include a controller 1120 configured to control the memories 1200*a* and 1200*b* and/or the storage devices 1300*a* and 1300*b*. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200*a* and 1200*b* may be used as main memory devices of the image evaluation system 1000. Although each of the memories 1200*a* and 1200*b* may include a volatile memory, such as static random access memory (SRAM) and/or dynamic RAM (DRAM), each of the memories 1200*a* and 1200*b* may include non-volatile memory, such as a flash memory, phase-change RAM (PRAM) and/or resistive RAM (RRAM). The memories 1200*a* and 1200*b* may be implemented in the same package as the main processor 1100.

The storage devices 1300*a* and 1300*b* may serve as non-volatile storage devices configured to store data regardless of whether power is supplied thereto, and have larger storage capacity than the memories 1200*a* and 1200*b*. The storage devices 1300*a* and 1300*b* may respectively include storage controllers (STRG CTRL) 1310*a* and 1310*b* and non-volatile memories (NMVs) 1320*a* and 1320*b* configured to store data via the control of the storage controllers 1310*a* and 1310*b*. Although the NVMs 1320*a* and 1320*b* may include flash memories having a two-dimensional (2D) structure or a three-dimensional (3D) V-NAND structure, embodiments are not limited thereto, and the NVMs 1320*a* and 1320*b* may include other types of NVMs, such as PRAM and/or RRAM.

The storage devices 1300*a* and 1300*b* may be physically separated from the main processor 1100 and included in the image evaluation system 1000 or implemented in the same package as the main processor 1100. In addition, the storage devices 1300*a* and 1300*b* may have types of solid-state devices (SSDs) or memory cards and be removably combined with other components of the system 100 through an interface, such as the connecting interface 1480 that will be described below. The storage devices 1300*a* and 1300*b* may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include, for example, a camera, a camcorder, and/or a webcam. The image capturing device 1410 may include at least one image sensor.

The user input device 1420 may receive various types of data input by a user of the image evaluation system 1000 and include, for example, a touch pad, a keypad, a keyboard, a mouse, and/or a microphone.

The sensor 1430 may detect various types of physical quantities, which may be obtained from the outside of the image evaluation system 1000, and convert the detected physical quantities into electric signals. The sensor 1430 may include, for example, a temperature sensor, a pressure sensor, an illuminance sensor, a position sensor, an acceleration sensor, a biosensor, and/or a gyroscope sensor.

The communication device 1440 may transmit and receive signals between other devices outside the image evaluation system 1000 according to various communication protocols. The communication device 1440 may include, for example, an antenna, a transceiver, and/or a modem.

The display 1450 and the speaker 1460 may serve as output devices configured to respectively output visual information and auditory information to the user of the image evaluation system 1000.

The power supplying device 1470 may appropriately convert power supplied from a battery embedded in the image evaluation system 1000 and/or an external power source, and supply the converted power to each of components of the image evaluation system 1000.

The connecting interface 1480 may provide connection between the image evaluation system 1000 and an external device, which is connected to the image evaluation system 1000 and configured to transmit and receive data to and from the image evaluation system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

The image evaluation system 1000 may evaluate the quality of the image sensor. For example, the image evaluation system 1000 may evaluate the quality of the image sensor by measuring the distortion of an image (or image data) captured by the image sensor. The image evaluation system 1000 may evaluate the quality of the image sensor included in the image evaluation system 1000 as a part of the image capturing device 1410 by measuring the distortion of an image (or image data) captured by the image sensor. According to another embodiment, the image evaluation system 1000 may evaluate the quality of an external image sensor by receiving an image captured by the external image sensor through the communication device 1440 and measuring the distortion of the image received through the communication device 1440.

In an embodiment, the image evaluation system 1000 may evaluate the quality of the image sensor upon capturing a text. The text may be composed of lines. When the distortion occurs due to the image sensor, lengths of the lines of the text may change, or lines spaced from each other may be joined or may overlap each other. Because the text has unique shapes, the distortion occurring in the text may significantly affect the user experience compared to the distortion occurring in any other objects.

A text is composed of characters, and different shapes of characters are currently used. Accordingly, a way to create texts by using various characters, to capture the created texts, and to evaluate the quality of an image sensor based on the captured result may requires significant time and costs.

One of the features characters have in common is that the characters are composed of lines. In an embodiment of the present disclosure, image sensors may capture patterns including lines. The image evaluation system 1000 may evaluate a text capturing quality of an image sensor capturing patterns including a plurality of neighboring lines, by measuring the distortion from an image of patterns including lines.

Figure 2:
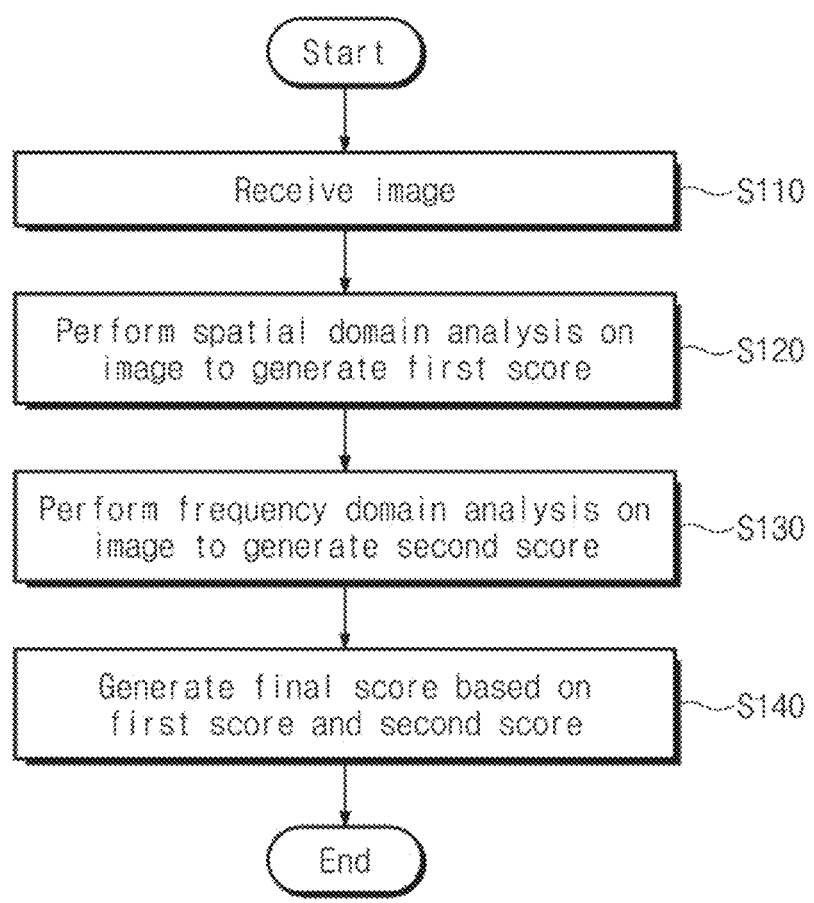
FIG. 2 illustrates an operating method of an image evaluation system according to an embodiment.

FIG. 2 illustrates an operating method of the image evaluation system 1000 according to an embodiment of the present disclosure. Referring to FIGS. 1 and 2, in operation S110, the main processor 1100 may receive an image (or image data). For example, the main processor 1100 may read an image, which is captured by the image capturing device 1410 and is then stored in at least one of the memories 1200a to 1200b, from at least one of the memories 1200a to 1200b.

The image may be a replacement image for measuring a text capturing quality of an image sensor. The image may refer to an image that is obtained by capturing lines repeatedly disposed in a first direction and extending in a second direction perpendicular to the first direction. For example, the image may include distortions occurring between different lines.

In operation S120, the main processor 1100 may perform a spatial domain analysis on the received image to generate a first score (e.g., a first quality score of an image sensor). For example, the spatial domain analysis may be performed to measure the degree of distortion of each line from patterns including lines of the image.

In operation S130, the main processor 1100 may perform a frequency domain analysis on the received image to generate a second score (e.g., a second quality score of an image sensor). For example, the frequency domain analysis may be performed to measure the degree of distortion occurring between lines from the patterns including the lines of the image.

In operation S140, the main processor 1100 may generate a final score (e.g., a final quality score of an image sensor) based on the first score and the second score. The final score may include a result of measuring the degree of distortion of each line from the patterns including the lines of the image and a result of measuring the degree of distortion occurring between the lines from the patterns including the lines of the image.

The spatial domain analysis may be easier to specify the distortion occurring in each line. The frequency domain analysis may be easier to measure distortions occurring between lines. The image evaluation system 1000 according to an embodiment of the present disclosure may measure distortions occurring in respective lines and between lines more accurately by combining the spatial domain analysis and the frequency domain analysis. Accordingly, the image evaluation system 1000 according to an embodiment of the present disclosure may more accurately measure distortions of image sensors capturing a text composed of lines.

Figure 3:
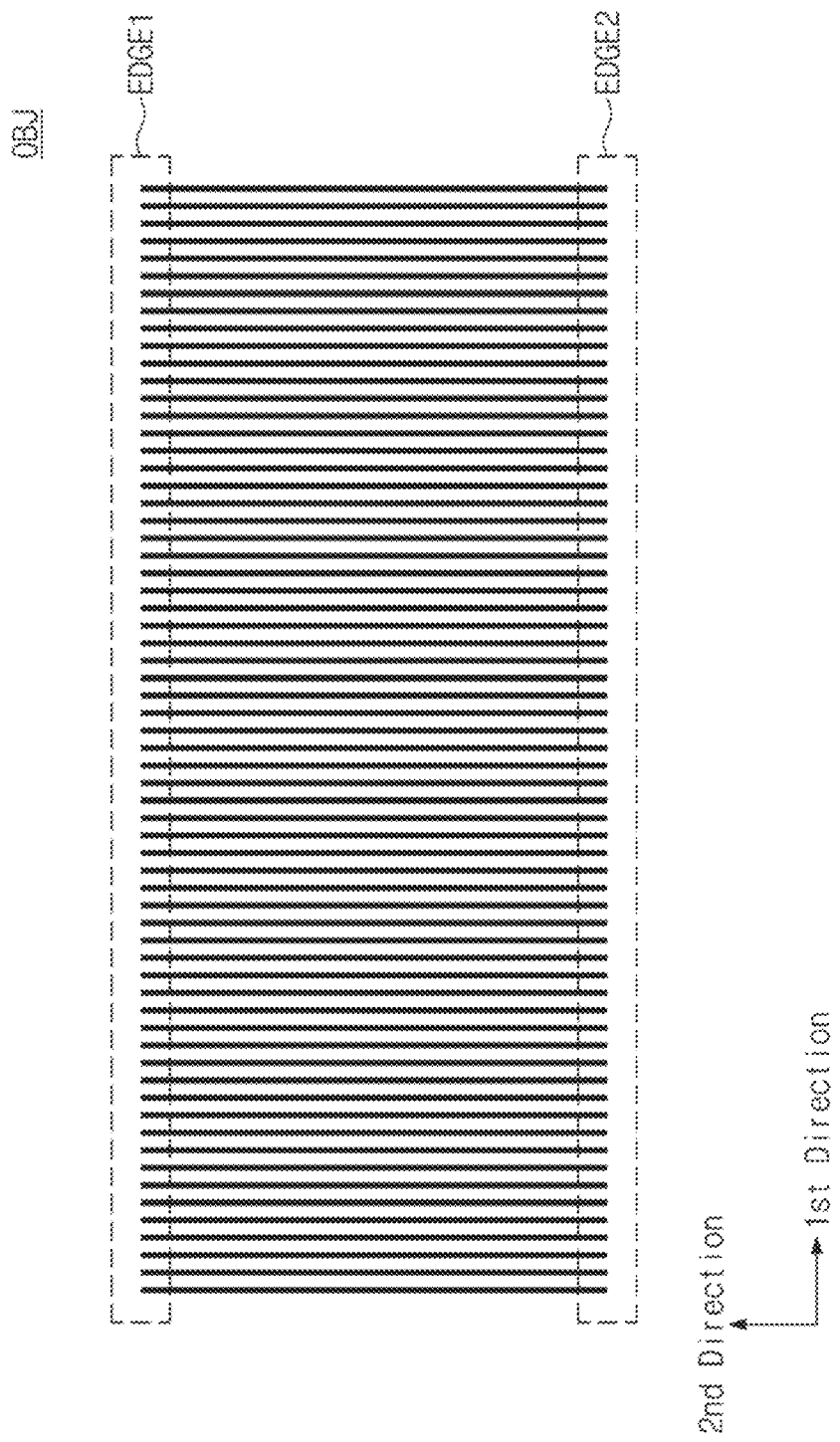
FIG. 3 illustrates an example of a capturing object used to measure the quality of an image sensor.

FIG. 3 illustrates an example of a capturing object OBJ used to measure the quality of an image sensor. Referring to FIGS. 1 and 3, the capturing object OBJ may include a plurality of neighboring lines. For example, the capturing object OBJ may include lines that are repeatedly disposed in the first direction and extend in the second direction. In an embodiment, the capturing object OBJ may be similar to a two-dimensional barcode image. The capturing object OBJ may include a plurality of lines and thus may cause a capturing effect similar to that upon capturing a text composed of lines.

The capturing object OBJ may include a first edge EDGE1 and a second edge EDGE2. The spatial domain analysis may be easier to measure distortions of respective lines occurring in the first edge EDGE1 and the second edge EDGE2. The frequency domain analysis may be easy to measure a distortion between lines in the first edge EDGE1 and the second edge EDGE2, and to measure a distortion between lines in the first edge EDGE1 and the second edge EDGE2 or a distortion between lines with respect to all the lines including the first edge EDGE1 and the second edge EDGE2.

Figure 4:
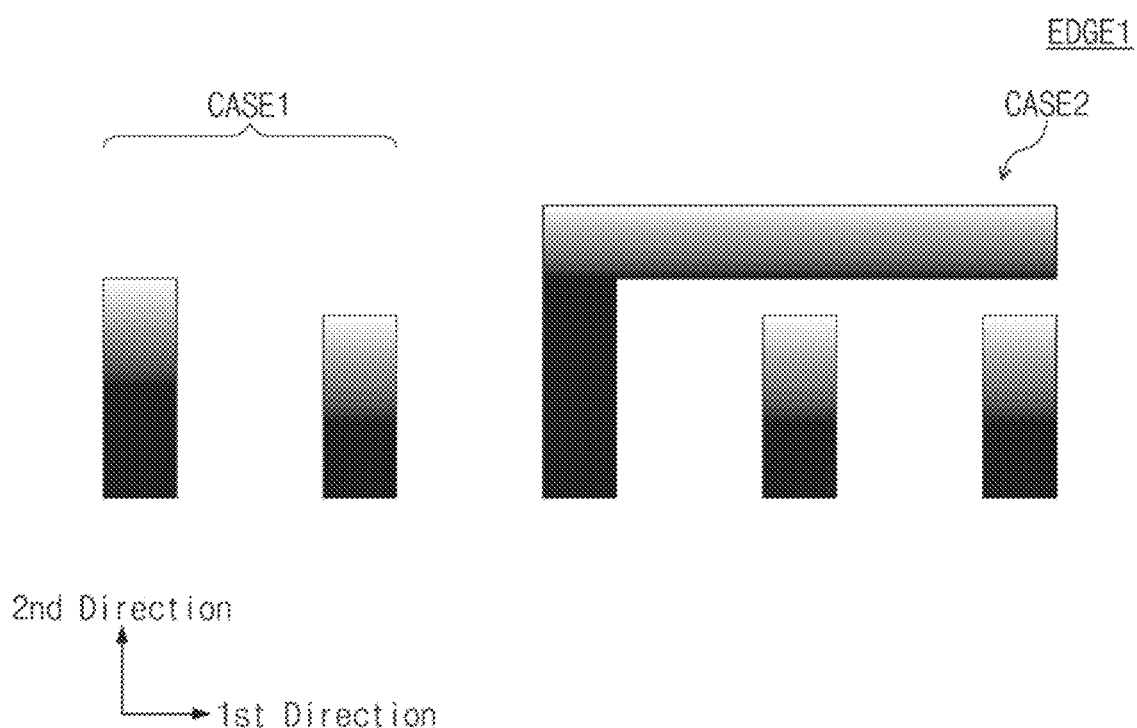
FIG. 4 illustrates an example of distortions occurring in a first edge of a capturing object upon capturing the capturing object of FIG. 3.

FIG. 4 illustrates an example of distortions occurring in the first edge EDGE1 of the capturing object OBJ upon capturing the capturing object OBJ of FIG. 3. Referring to FIGS. 1, 3, and 4, distortions occurring upon capturing the capturing object OBJ may include a first case CASE1 and a second case CASE2.

Even though lengths (e.g., lengths in the second direction) of lines of the capturing object OBJ are identical to each other, the distortion of the first case CASE1 may include a distortion in which lengths of lines in an image obtained by capturing the capturing object OBJ by using an image sensor are differently captured. Because the distortion of the first case CASE1 occurs in each line, it may be considered as a local distortion.

Even though lines of the capturing object OBJ are identical to each other and are independent lines, the distortion of the second case CASE2 may include a distortion in which a specific line in an image obtained by capturing the capturing object OBJ by using an image sensor is captured as extending to locations of neighboring other lines. Because the distortion of the second case CASE2 occurs in two or more lines, it may be considered as a global distortion.

Figure 5:
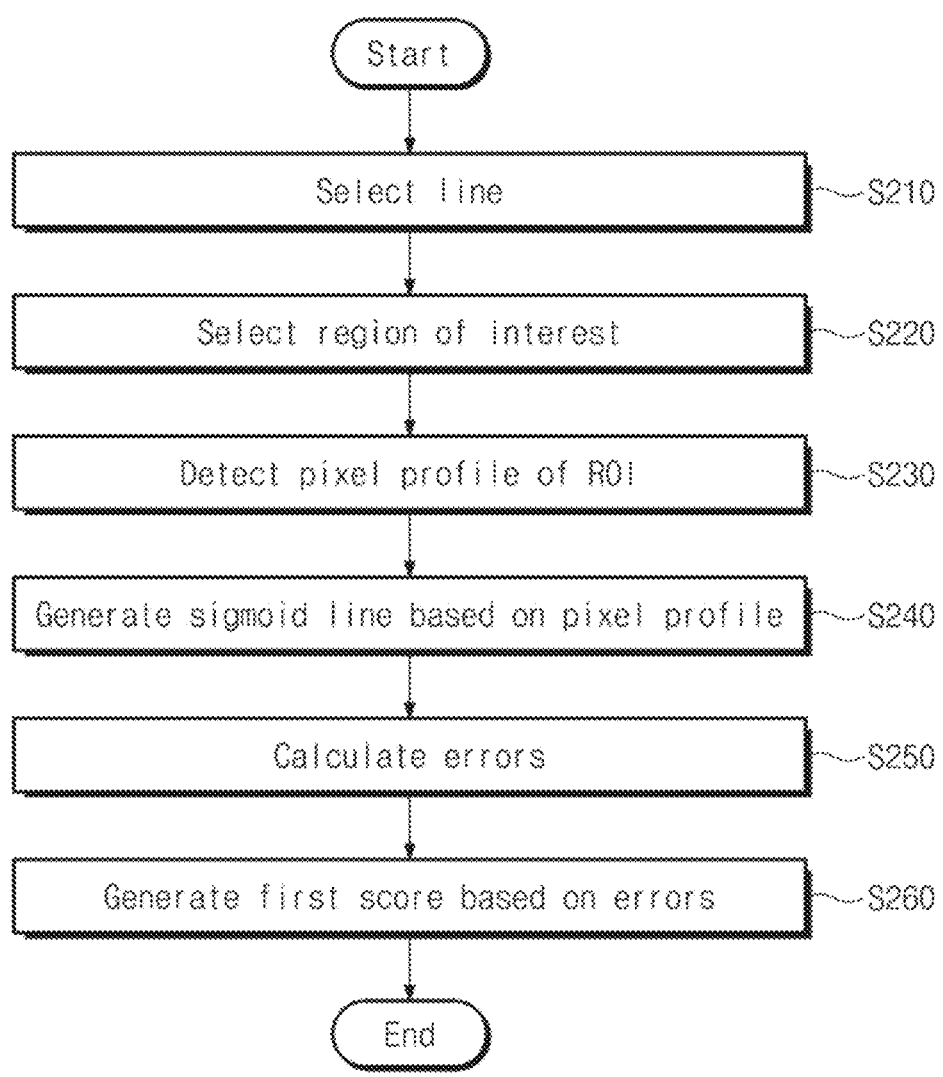
FIG. 5 illustrates an example of a process in which a main processor performs a spatial domain analysis.
Figure 6:
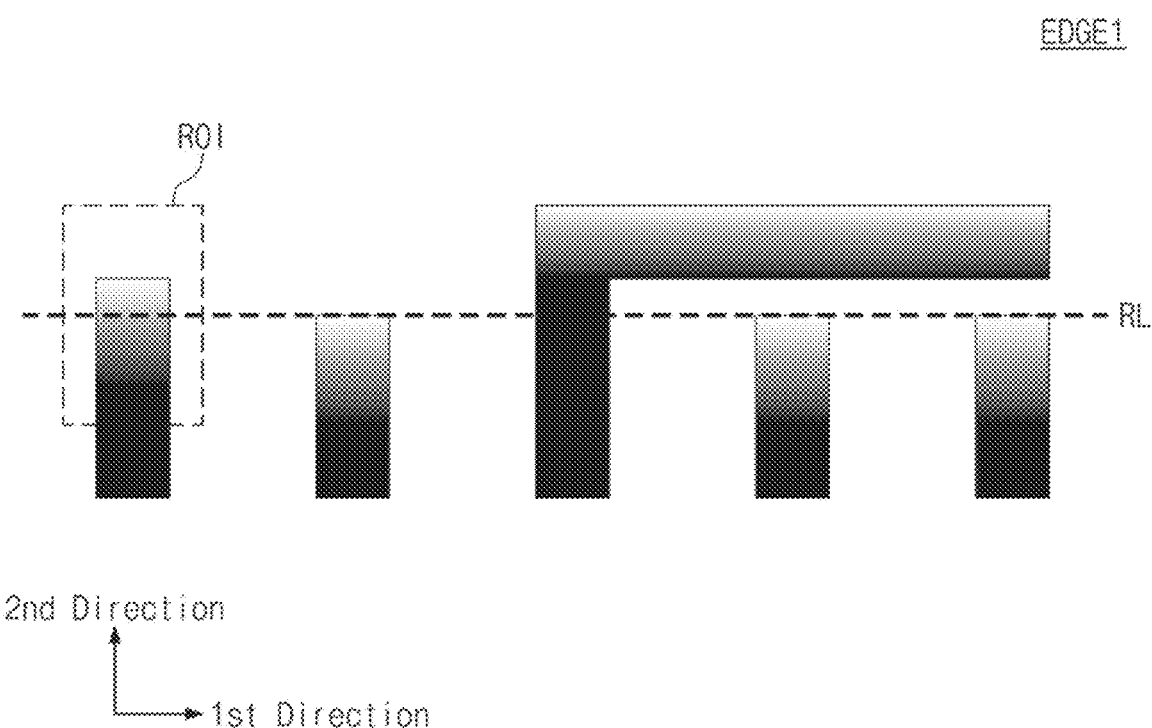
FIG. 6 illustrates an example in which a region of interest is selected in one line.

FIG. 5 illustrates an example of a process in which the main processor 1100 performs a spatial domain analysis. Referring to FIGS. 1, 3, and 5, in operation S210, the main processor 1100 may select one of a plurality of neighboring lines. In operation S220, the main processor 1100 may select a region of interest ROI in the selected line. An example in which the region of interest ROI is selected in one line is illustrated in FIG. 6. Referring to FIG. 6, the region of interest ROI of one line may be selected in an area included in the first edge EDGE1.

For example, a reference line RL may be defined at the outer contour of lines in the first edge EDGE1. The reference line RL may refer to a line connecting end points of the lines in the first edge EDGE1. In each line, the region of interest ROI may be the shape of a rectangle in which lengths extending in the first direction and an opposite direction of the first direction with respect to the reference line RL are identical to each other, but embodiments are not limited thereto. The region of interest ROI may include a portion in which the local distortion intensively occurs in a plurality of neighboring lines.

In FIG. 6, an example in which the region of interest ROI is set in the first edge EDGE1 is illustrated, but embodiments are not limited thereto, and the main processor 1100 may select the region of interest ROI of a line included in the second edge EDGE2.

Figure 7:
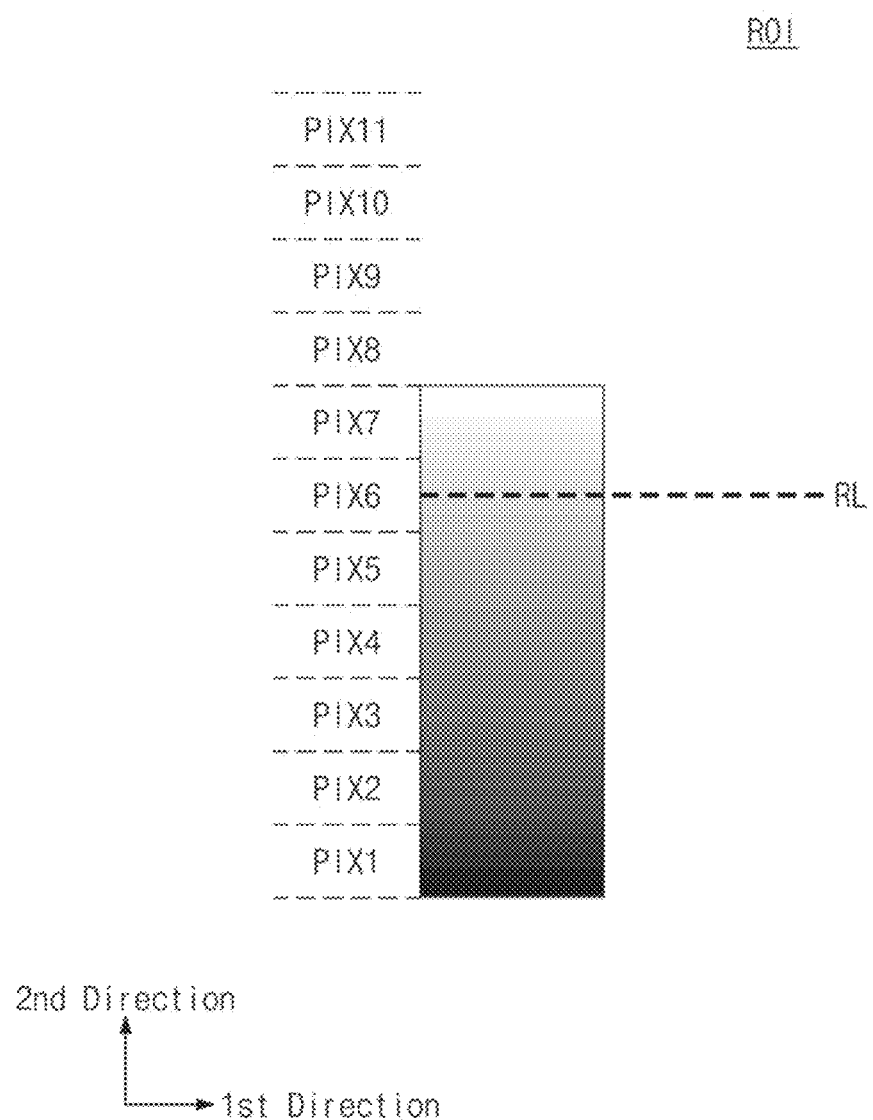
FIG. 7 illustrates an example in which a pixel profile is detected in a region of interest of a first edge.

Referring again to FIGS. 1, 3, and 5, in operation S230, the main processor 1100 may detect a pixel profile of the region of interest ROI. An example in which a pixel profile is detected in the region of interest ROI of the first edge EDGE1 is illustrated in FIG. 7. Referring to FIG. 7, pixel values (or a change of pixel values) of pixels PIX1 to PIX11 in the region of interest ROI, which are disposed in the second direction, may be detected as a pixel profile. In an embodiment, the pixel values may be digital values generated by pixels of an image sensor and may indicate the intensity of light incident onto the pixels of the image sensor. The pixel values may be used to adjust the brightness of each display pixel when the display 1450 displays an image.

In an embodiment, a pixel that captures a light reflected from a line may generate a smaller pixel value, and a pixel that captures a light reflected from a line-free portion (e.g., a paper in the case where lines are marked on the paper) may generate a higher pixel value. However, due to the local distortion, pixel values of lines may have a change, such as gradation, around the reference line RL. The main processor 1100 may quantify local distortions of lines by detecting a pixel profile indicating pixel values around the reference line RL.

Figure 8:
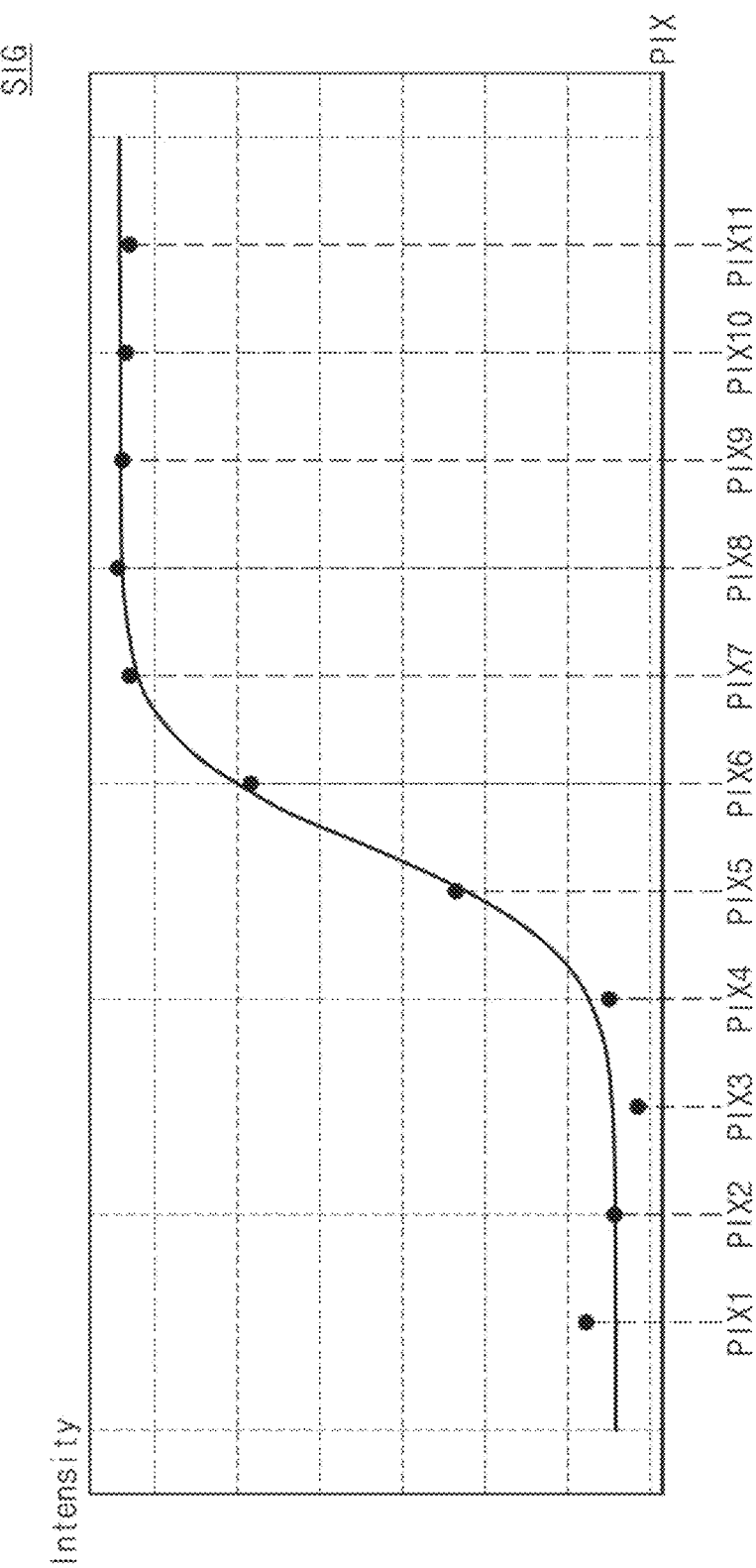
FIG. 8 illustrates an example in which a main processor generates a sigmoid line.

Referring again to FIGS. 1, 3, and 5, in operation S240, the main processor 1100 may generate a sigmoid line based on the pixel profile. An example in which the main processor 1100 generates a sigmoid line is illustrated in FIG. 8. Referring to FIG. 8, a horizontal axis represents locations of pixels in the region of interest ROI in the second direction, and a vertical axis represents a pixel value (e.g., a pixel intensity).

Pixel values (e.g., pixel intensities) of the pixels PIX1 to PIX11 may be discrete values. The local distortion of the region of interest ROI may be quantified by generating a sigmoid line as a trend line of the pixel values of the pixels PIX1 to PIX11.

Figure 9:
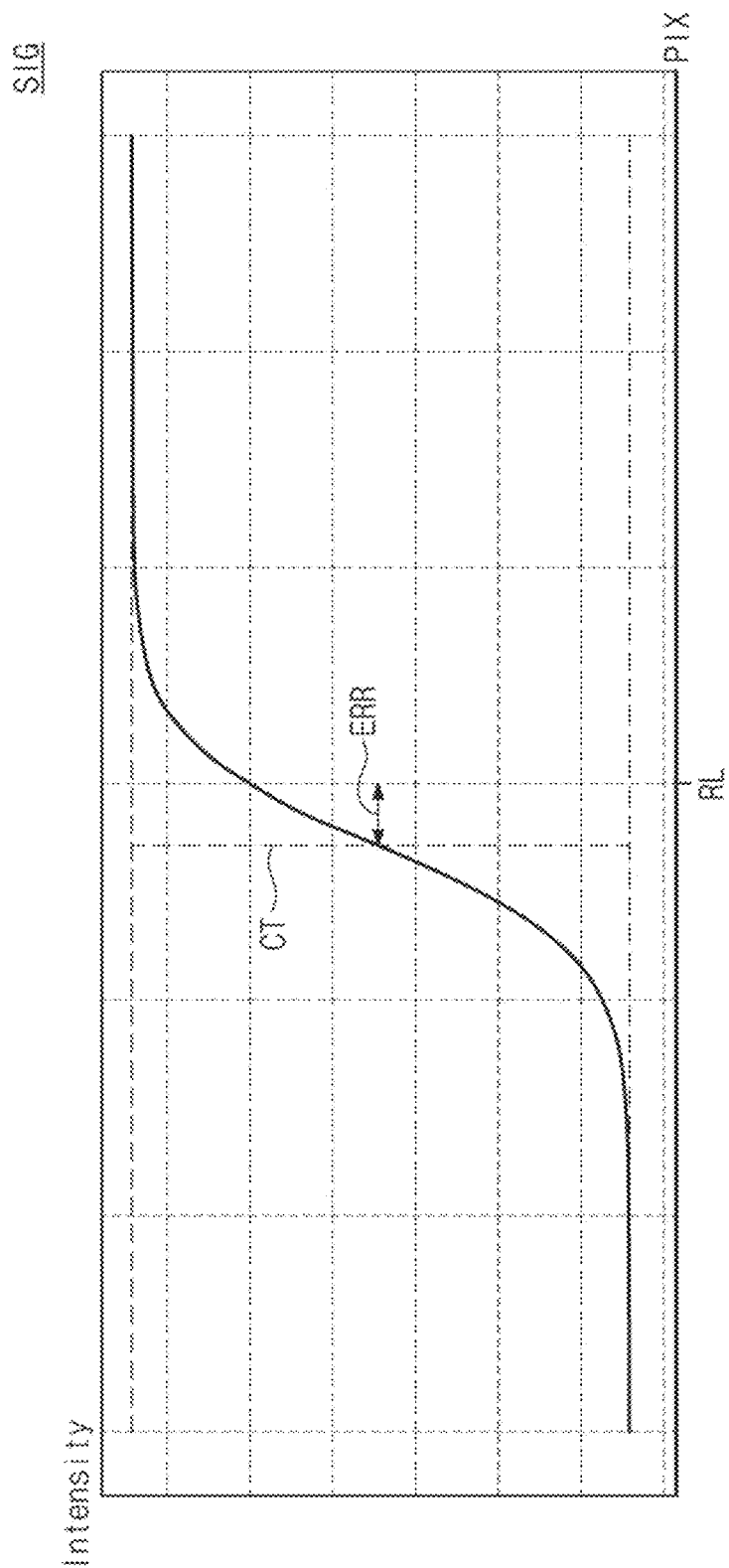
FIG. 9 illustrates an example in which a main processor calculates errors based on a sigmoid line.

Referring again to FIGS. 1, 3, and 5, in operation S250, the main processor 1100 may obtain (calculate) errors based on the sigmoid line. An example in which the main processor 1100 obtains errors based on a sigmoid line is illustrated in FIG. 9. Referring to FIG. 9, a horizontal axis represents locations of pixels in the region of interest ROI in the second direction similar to the horizontal axis of FIG. 8, and a vertical axis represents a pixel value (e.g., a pixel intensity) similar to the vertical axis of FIG. 8.

As described with reference to FIGS. 7, 8, and 9, the reference line RL may correspond to a location of the sixth pixel PIX6. When there is no distortion (or when a pixel value is smaller than reference value), a location of the center of the sigmoid line SIG, for example, a location corresponding to a median value between a maximum value and a minimum value may coincide with the reference line RL. When a distortion occurs due to an image sensor, the center of the sigmoid line SIG may be different in location from the reference line RL. Accordingly, a location error ERR between the center CT of the sigmoid line SIG and the reference line RL may be considered as the local distortion of the image sensor is quantified.

Referring again to FIGS. 1, 3, and 5, in operation S260, the main processor 1100 may generate a first score based on errors. For example, the main processor 1100 may generate the first score by subtracting a score corresponding to each error from a maximum value of the first score.

Figure 10:
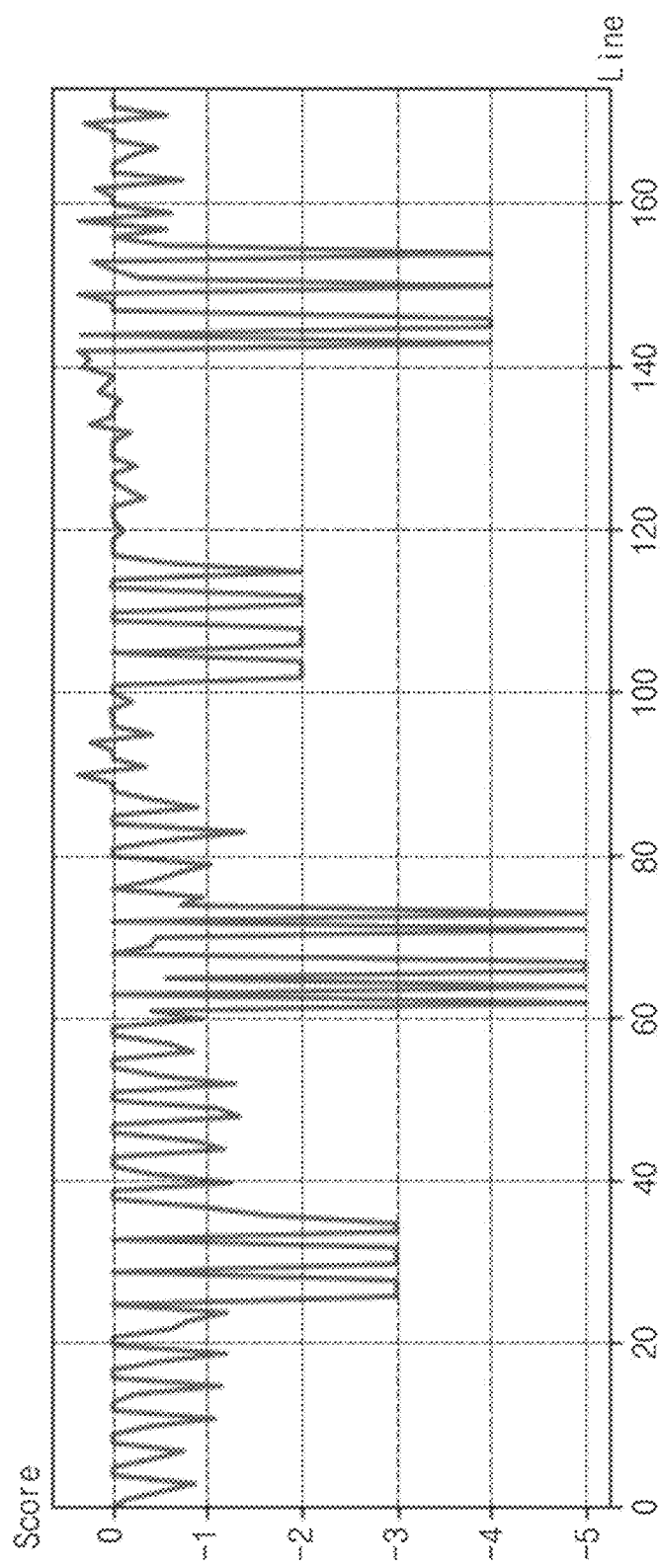
FIG. 10 illustrates an example in which errors of a plurality of neighboring lines are calculated.

In an embodiment, the main processor 1100 may perform the method of FIG. 5 for each of the plurality of neighboring lines. The main processor 1100 may generate a final first score by subtracting scores corresponding to errors of the plurality of neighboring lines from the maximum value of the first score. An example in which error of the plurality neighboring lines are obtained is illustrated in FIG. 10. Referring to FIG. 10, a horizontal axis represents locations (or orders) of lines in the first direction (refer to FIG. 3), and a vertical axis represents an error score corresponding to each line. In an embodiment, the plurality neighboring lines may include lines, the number of which exceeds 160. An error may be obtained for each line, and a score of each line may be decreased from the maximum value of the first score as much as a score corresponding to the error.

Figure 11:
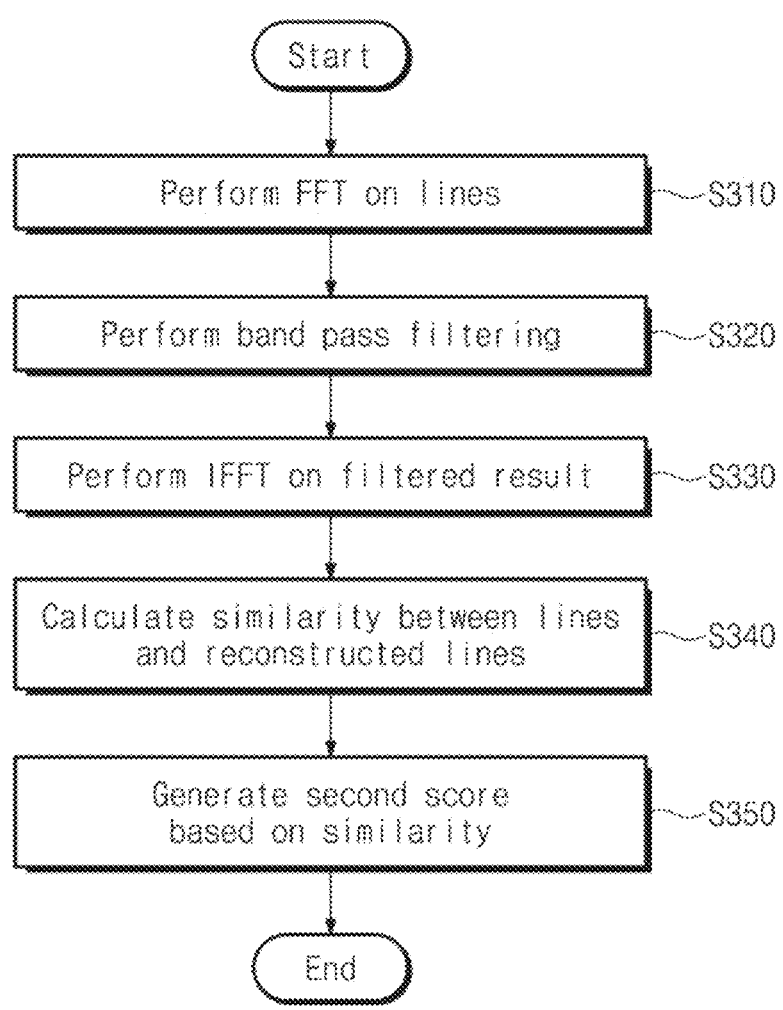
FIG. 11 illustrates an example of a process in which a main processor performs a frequency domain analysis.

FIG. 11 illustrates an example of a process in which the main processor 1100 performs a frequency domain analysis. Referring to FIGS. 1, 3, and 11, in operation S310, the main processor 1100 may perform Fourier transform (e.g., FFT (Fast Fourier Transform)) on a shape of patterns (e.g., lines) on an image to generate frequency domain data of a plurality of neighboring lines. An example of frequency domain data of a plurality of neighboring lines is illustrated in FIG. 12.

Figure 12:
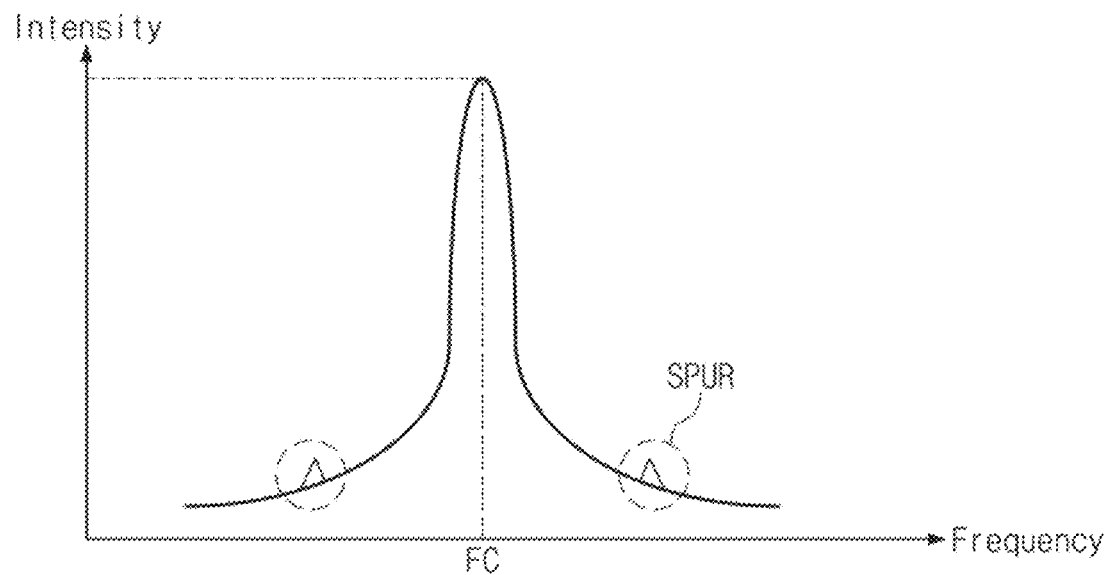
FIG. 12 illustrates an example of frequency domain data of a plurality of neighboring lines.

Referring to FIG. 12, a horizontal axis represents a frequency, and a vertical axis represents an intensity according to a frequency, for example, a pixel value (e.g., a pixel intensity). As illustrated in FIG. 3, the plurality of neighboring lines may be spaced from each other at a same distance. Because the plurality of neighboring lines are disposed at a period of a given distance, the frequency domain data of the shape of the plurality of neighboring lines may have a peak value at the center frequency FC corresponding to a period at which the plurality of neighboring lines are disposed. Similar to the second case CASE2 of FIG. 4, the global distortion may appear in the frequency domain data of the shape of the plurality of neighboring lines as a protrusion SPUR.

Referring again to FIGS. 1, 3, and 11, in operation S320, the main processor 1100 may perform band pass filtering (BPF) on the frequency domain data. An example in which the main processor 1100 performs band pass filtering on frequency domain data is illustrated in FIG. 13.

Figure 13:
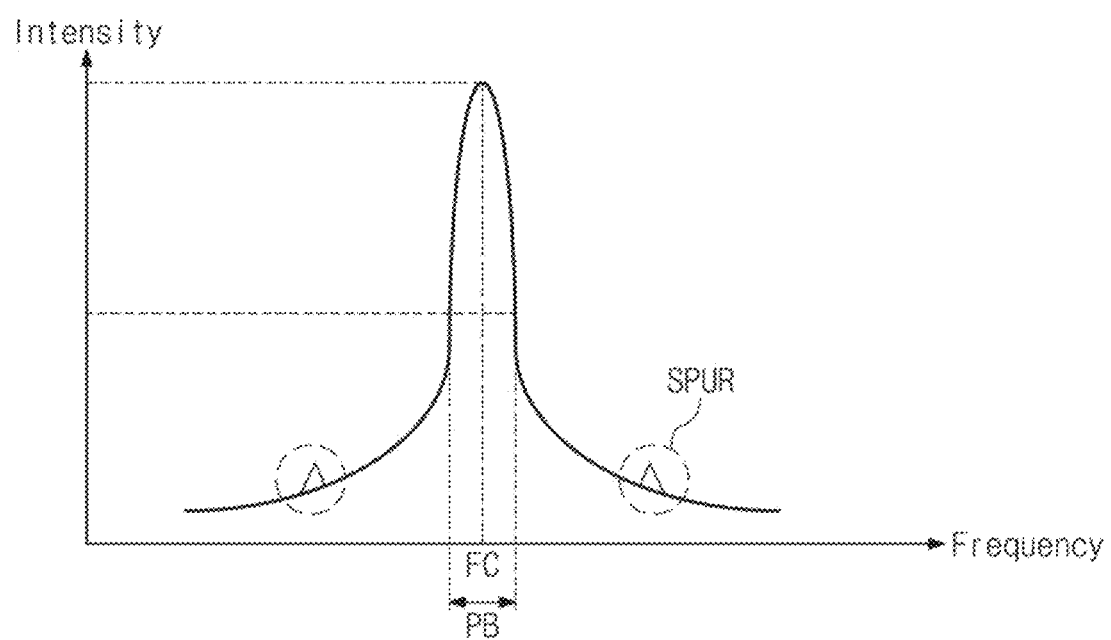
FIG. 13 illustrates an example in which a main processor performs band pass filtering on frequency domain data.

Referring to FIG. 13, a horizontal axis represents a frequency, and a vertical axis represents an intensity according to a frequency, for example, a pixel value (e.g., a pixel intensity). A passband PB of the band pass filtering may be defined based on the center frequency FC having a peak value. The passband PB may be defined as a frequency range including the center frequency FC. The passband PB may be defined as a range of frequencies whose intensities are as high as a specific ratio compared to the peak value. For example, the passband PB may be defined as a range of frequencies whose values (e.g., intensities) are greater than 50% of the peak value.

When the band pass filtering is performed on the passband PB, the protrusion SPUR may be removed. For example, information with respect to the protrusion SPUR in case CASE2 of FIG. 4 may be removed from the frequency domain data.

Figure 14:
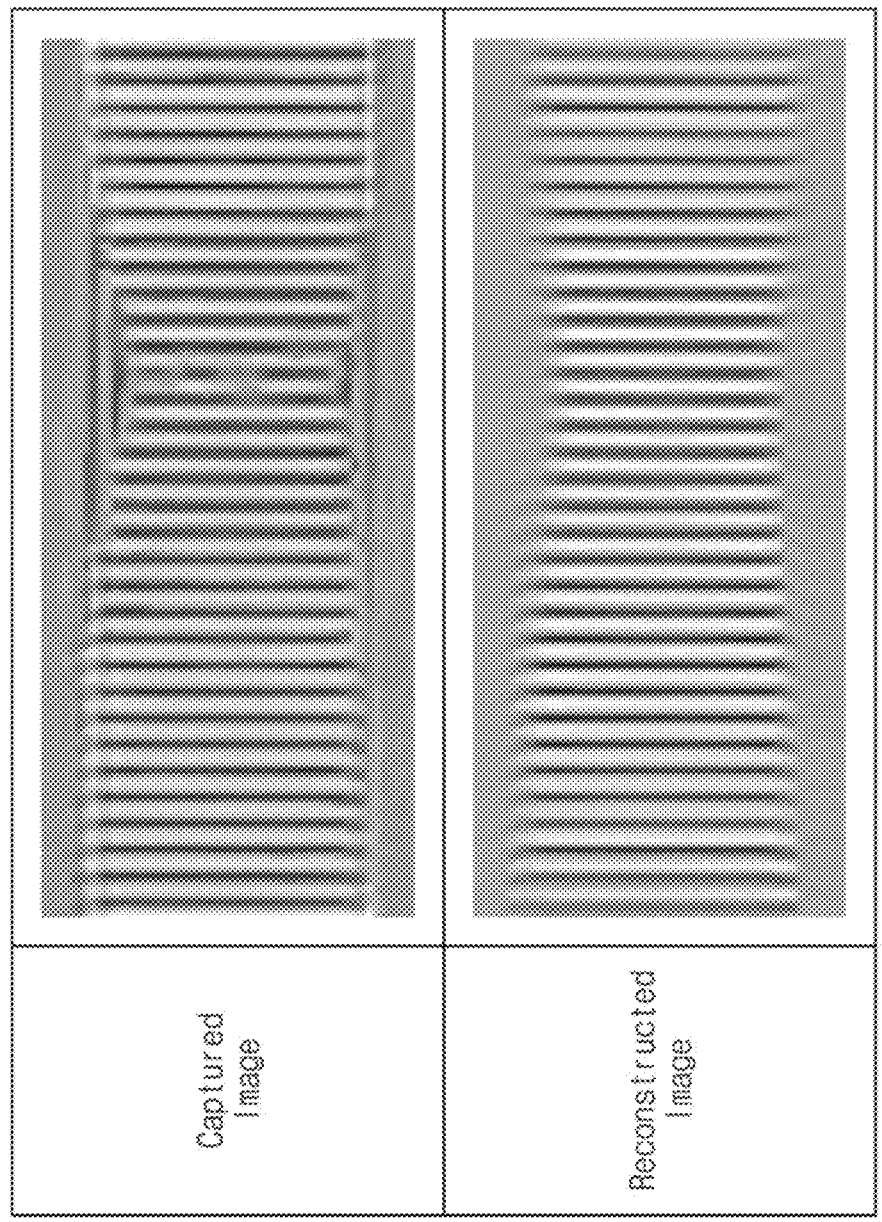
FIG. 14 illustrates an example of a result of capturing a plurality of neighboring lines by using an image sensor and a reconstructed image.

Referring again to FIGS. 1, 3, and 11, in operation S330, the main processor 1100 may perform inverse Fourier transform on the filtered result. For example, the main processor 1100 may reconstruct the spatial domain data, that is, the plurality neighboring lines by perform IFFT (Inverse Fast Fourier Transform). The reconstructed data may be similar to the plurality of neighboring lines of FIG. 2, but may not include global distortions such as the second case CASE2 of FIG. 4. An example of a result of capturing the plurality of neighboring lines by using an image sensor and a reconstructed image is illustrated in FIG. 14.

In operation S340, the main processor 1100 may obtain the similarity (degree of similarity) between the plurality of neighboring lines of the captured image and the plurality of neighboring lines of the reconstructed image. In obtaining the similarity, such the global distortions as the second case CASE2 of FIG. 4 may act as a difference and may decrease the similarity. Accordingly, as the similarity increases, it is determined that the global distortion of the image sensor becomes smaller. As the similarity decreases, it is determined that the global distortion of the image sensor becomes greater.

In operation S350, the main processor 1100 may generate a second score based on the similarity. For example, the main processor 1100 may normalize the similarity based on a maximum value of the second score.

In an embodiment, a maximum value of a final score may be 100. The maximum value of the first score may be 50. The main processor 1100 may decrease the first score from 50 as much as a score corresponding to each error. The maximum value of the second score may be 50. The similarity may be obtained as a value between 0 and 1. The main processor 1100 may obtain the second score by multiplying the obtained similarity and 50 being the maximum value of the second score together. The main processor 1100 may add the first score and the second score to generate the final score.

Figure 15:
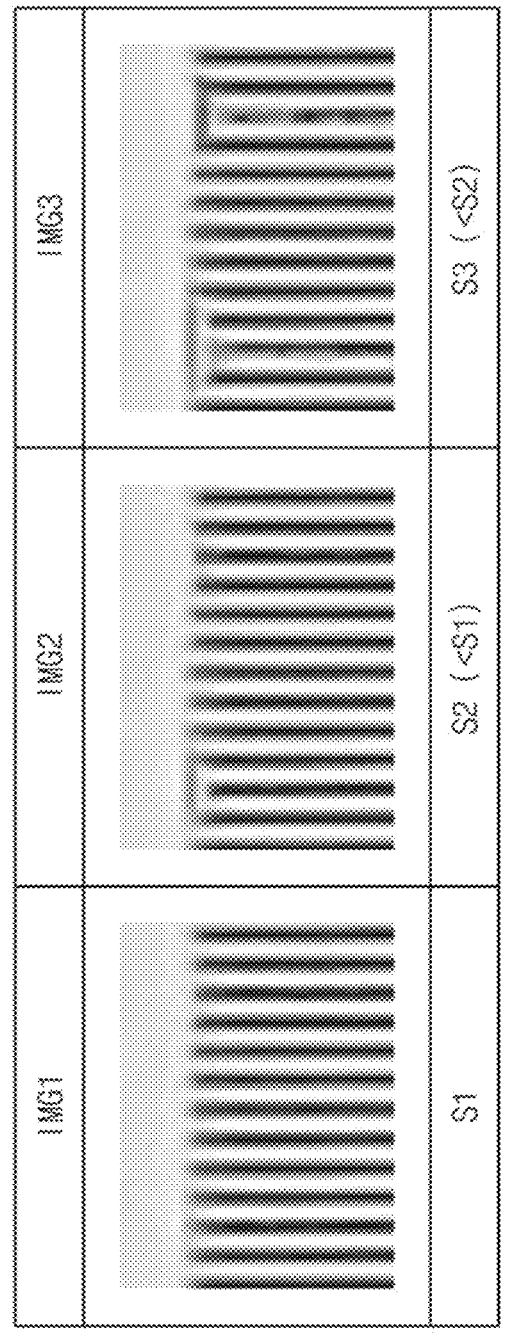
FIG. 15 illustrates an example in which a plurality of neighboring lines are captured by using image sensors with different qualities.

FIG. 15 illustrates an example in which a plurality of neighboring lines are captured by using image sensors with different qualities. For example, a first image IMG1, a second image IMG2, and a third image IMG3 may be respectively captured by using a first image sensor, a second image sensor, and a third image sensor.

Referring to FIGS. 1 and 15, the main processor 1100 may assign a first score S1 to the first image IMG1. The main processor 1100 may assign a second score S2 smaller than the first score S1 to the second image IMG2. The main processor 1100 may assign a third score S3 smaller than the second score S2 to the third image IMG3.

Figure 16:
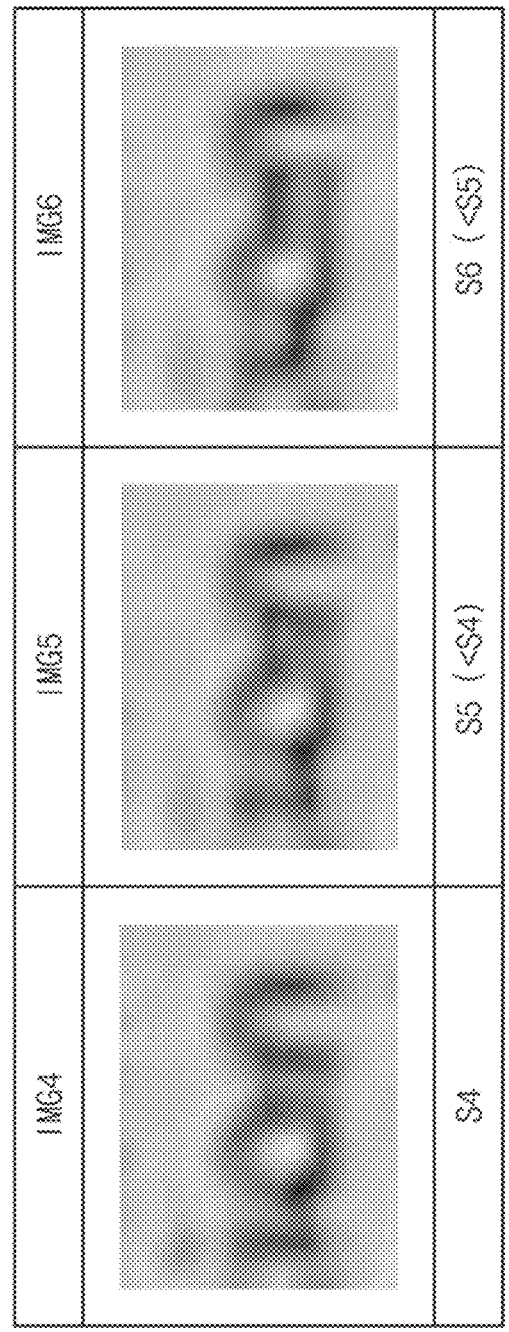
FIG. 16 illustrates an example in which a text is captured by using image sensors with different qualities.

FIG. 16 illustrates an example in which a text is captured by using image sensors with different qualities. In an embodiment, a fourth image IMG4, a fifth image IMG5, and a sixth image IMG6 that are obtained by capturing the same text by using the first image sensor, the second image sensor, and the third image sensor capturing the first image IMG1, the second image IMG2, and the third image IMG3 respectively are illustrated in FIG. 16.

The user may assign a fourth score S4 to the fourth image IMG4 captured by using the first image sensor. The user may assign a fifth score S5 smaller than the fourth score S4 to the fifth image IMG5 captured by using the second image sensor. The user may assign a sixth score S6 smaller than the fifth score S5 to the sixth image IMG6 captured by using the third image sensor.

As described with reference to FIGS. 15 and 16, the trend of scores that the main processor 1100 assigns based on an image of lines appears to be the same as the trends of scores that the user may assign based on an image of a text. Accordingly, the score that the main processor 1100 assigns based on an image of lines may indicate a text capturing quality of an image sensor.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to the present disclosure, a computing device capable of evaluating the quality of an image sensor by using similar text patterns and an operating method of the computing device are provided. Accordingly, the quality of the image sensor may be automatically evaluated.

While the present disclosure has been described with reference to embodiments thereof, it will be apparent to those of ordinary skill in the art that various changes and modifications may be made thereto without departing from the spirit and scope of the present disclosure as set forth in the following claims and their equivalents.

What is claimed is:

1. An image sensor evaluation method using a computing device comprising a processor, the method comprising:
   receiving, by the processor, image data obtained by capturing a plurality of neighboring lines by an image sensor;
   performing, by the processor, a spatial domain analysis on the image data to generate a first quality score of the image sensor;
   performing, by the processor, a frequency domain analysis on the image data to generate a second quality score of the image sensor;
   generating, by the processor, a final quality score of the image sensor based on the first quality score and the second quality score; and
   operating the image sensor based on the final quality score to reduce distortion of the image data,
   wherein the plurality of neighboring lines on the image data include lines extending in a second direction and disposed in a first direction perpendicular to the second direction,
   wherein the performing of the spatial domain analysis to generate the first quality score comprises:
      selecting a region of interest at a first end and a second end of each of the lines disposed in the first direction, the first end being opposite to the second end;
      detecting a pixel profile in the region of interest;
      generating a sigmoid line based on the pixel profile;
      obtaining an error of the region of interest based on the sigmoid line; and
      generating the first quality score based on the error of the region of interest on each of the lines.

2. The method of claim 1, wherein the performing of the frequency domain analysis to generate the second quality score comprises:
performing a Fourier transform on a shape of the plurality of neighboring lines on the image data to generate frequency domain data.

3. The method of claim 2, wherein the performing of the frequency domain analysis to generate the second quality score further comprises:
performing band pass filtering on the frequency domain data.

4. The method of claim 3, wherein the band pass filtering is performed based on a frequency of a peak value of the frequency domain data.

5. The method of claim 4, wherein the band pass filtering is performed on frequencies having values that are greater than 50% of the peak value.

6. The method of claim 3, wherein the performing of the frequency domain analysis to generate the second quality score further comprises:
performing an inverse Fourier transform on result data of the band pass filtering.

7. The method of claim 6, wherein the performing of the frequency domain analysis to generate the second quality score further comprises:
obtaining a degree of similarity between result data of the inverse Fourier transform and the plurality of neighboring lines included in the image data.

8. The method of claim 7, wherein the performing of the frequency domain analysis to generate the second quality score further comprises:
normalizing the degree of similarity to generate the second quality score.

9. The method of claim 1, wherein the pixel profile comprises pixel values of pixels included in the region of interest, which are disposed in the second direction.

10. The method of claim 1, wherein the obtaining of the error comprises:
detecting a difference between a center of the sigmoid line and a reference line of the lines repeatedly disposed in the first direction.

11. The method of claim 1, wherein the generating of the first quality score based on the error of the region of interest of each of the lines comprises:
subtracting values corresponding to the error of each of the lines from a maximum value of the first quality score.

12. The method of claim 1, wherein the final quality score corresponds to a quality when the image sensor captures a text.

13. An image sensor evaluation method using a computing device comprising a processor, the method comprising:
receiving, by the processor, image data obtained by capturing a plurality of neighboring lines through an image sensor;
performing, by the processor, a Fourier transform on a shape of the plurality of neighboring lines on the image data to generate frequency domain data;
performing, by the processor, band pass filtering on the frequency domain data;
performing, by the processor, an inverse Fourier transform on result data of the band pass filtering;
obtaining, by the processor, a degree of similarity between result data of the inverse Fourier transform and the plurality of neighboring lines; and
normalizing, by the processor, the degree of similarity to generate a quality score of the image sensor;
operating the image sensor based on the quality score to reduce distortion of the image data.

14. The method of claim 13, wherein the plurality of neighboring lines on the image data comprise lines extending in a second direction and disposed in a first direction perpendicular to the second direction.

15. The method of claim 13, wherein the band pass filtering is performed on frequencies having values that are greater than 50% of a peak value of the frequency domain data, based on a frequency of the peak value.

16. The method of claim 13, further comprising:
performing, by the processor, a spatial domain analysis on the image data to generate a second quality score of the image sensor; and
generating, by the processor, a final quality score of the image sensor based on the quality score of the image sensor and the second quality score.

17. The method of claim 16, wherein the plurality of neighboring lines on the image data comprise lines extending in a second direction and disposed in a first direction perpendicular to the second direction,
wherein the performing of the spatial domain analysis to generate the second quality score comprises:
selecting a region of interest at a first end and a second end of each of the lines disposed in the first direction, the first end being opposite to the second end;
detecting a pixel profile in the region of interest;
generating a sigmoid line based on the pixel profile;
obtaining an error of the region of interest based on the sigmoid line; and
generating the second quality score based on the error of the region of interest of each of the lines.

18. A computing device comprising:
a memory configured to receive image data obtained by capturing a plurality of neighboring lines from an image sensor; and
a processor configured to:
receive the image data from the memory;
generate a first quality score of the image sensor by performing a spatial domain analysis on the received image data;
generate a second quality score of the image sensor by performing a frequency domain analysis on the received image data;
generate a final quality score of the image sensor based on the first quality score and the second quality score; and
operate the image sensor based on the final quality score to reduce distortion of the image data,
wherein the plurality of neighboring lines on the image data comprise lines extending in a second direction and disposed in a first direction perpendicular to the second direction,
wherein the final quality score corresponds to a quality when the image sensor captures a text, and
wherein the performing of the frequency domain analysis to generate the second quality score further comprises:
performing a Fourier transform on a shape of the plurality of neighboring lines on the image data to generate frequency domain data;
performing band pass filtering on the frequency domain data;
performing an inverse Fourier transform on result data of the band pass filtering; and obtaining a degree of similarity between result data of the inverse Fourier transform and the plurality of neighboring lines included in the image data.

\* \* \* \* \*